US009325671B2

(12) United States Patent
Rohloff (10) Patent No.: US 9,325,671 B2
(45) Date of Patent: Apr. 26, 2016

(54) SYSTEM AND METHOD FOR MERGING ENCRYPTION DATA USING CIRCULAR ENCRYPTION KEY SWITCHING

(71) Applicant: RAYTHEON BBN TECHNOLOGIES CORP., Cambridge, MA (US)

(72) Inventor: Kurt Ryan Rohloff, South Hadley, MA (US)

(73) Assignee: RAYTHEON BBN TECHNOLOGIES CORP., Cambridge, MA (US)

( * ) Notice: Subject to any disclaimer, the term of this patent is extended or adjusted under 35 U.S.C. 154(b) by 159 days.

(21) Appl. No.: 14/184,541

(22) Filed: Feb. 19, 2014

(65) Prior Publication Data
US 2015/0237019 A1   Aug. 20, 2015

(51) Int. Cl.
*H04L 9/00* (2006.01)
*H04L 29/06* (2006.01)

(52) U.S. Cl.
CPC ............ *H04L 63/0428* (2013.01); *H04L 63/06* (2013.01); *H04L 63/061* (2013.01)

(58) Field of Classification Search
CPC ...................................................... H04L 63/12
See application file for complete search history.

(56) References Cited

U.S. PATENT DOCUMENTS

| 6,477,652 | B1 | 11/2002 | Yen et al. |
| 6,986,044 | B1 | 1/2006 | Inada |
| 7,373,517 | B1 | 5/2008 | Riggins |
| 8,363,744 | B2 | 1/2013 | Agee et al. |
| 2003/0044017 | A1 | 3/2003 | Briscoe |
| 2003/0163697 | A1 | 8/2003 | Pabla et al. |
| 2009/0063861 | A1 | 3/2009 | Chu |
| 2010/0220856 | A1 | 9/2010 | Kruys et al. |
| 2011/0085665 | A1 | 4/2011 | Hong et al. |
| 2011/0293093 | A1 | 12/2011 | Sun et al. |
| 2012/0243681 | A1 | 9/2012 | Francis |
| 2013/0142336 | A1* | 6/2013 | Fries et al. ............ H04L 9/0825 380/278 |
| 2013/0216044 | A1 | 8/2013 | Gentry et al. |
| 2013/0272521 | A1 | 10/2013 | Kipnis et al. |
| 2013/0318347 | A1 | 11/2013 | Moffat |
| 2014/0334624 | A1* | 11/2014 | Bernsen ................ H04L 9/0833 380/279 |
| 2015/0249649 | A1 | 9/2015 | Rohloff |

OTHER PUBLICATIONS

"Secure Voice over IP (SVoIP) vs. Voice over Secure IP (VOSIP) Installations", General Dynamics, C4 Systems, 2010 (4 pgs.).
Dunte, et al., "Secure Voice-over-IP", IJCSNS International Journal of Computer Science and Network Security, vol. 7, No. 6, Jun. 2007 (pp. 63-68).
Gentry, "A Fully Homomorphic Encryption Scheme", Dissertation Submitted to the Department of Computer Science and the Committee on Graduate Studies of Stanford University in Partial Fulfillment of the Requirements for the degree of Doctor of Philosophy, Sep. 2009 (209 pgs.).

(Continued)

*Primary Examiner* — Josnel Jeudy
(74) *Attorney, Agent, or Firm* — Lewis Roca; Rothgerber Christie LLP (57) ABSTRACT

A method for data privacy in a distributed communication system, in which a plurality of client terminals are arranged in a ring configuration merges encrypted streaming data using circular encryption key switching and without sharing any private keys in a distributed communication system. The merged data is then sent to client terminals to be further process by respective client terminals.

20 Claims, 8 Drawing Sheets

(56) References Cited

OTHER PUBLICATIONS

Gentry, "Computing Arbitrary Functions of Encrypted Data", Communications of the ACM, vol. 53, No. 3, Mar. 2010 (pp. 97-105).
Gentry, et al., "A Working Implementation of Fully Homomorphic Encryption", IBM T.J. Watson Research Center, 2009 (5 pgs.).
Halevi, et al., "Design and Implementation of a Homomorphic-Encryption Library", Apr. 11, 2013 (46 pgs.).
Lyubashevsky, et al., "A Toolkit for Ring-LWE Cryptography", May 16, 2013 (51 pgs.).

* cited by examiner

SYSTEM AND METHOD FOR MERGING ENCRYPTION DATA USING CIRCULAR ENCRYPTION KEY SWITCHING

STATEMENT REGARDING FEDERALLY SPONSORED RESEARCH

This invention disclosure is related to a government contract number FA8750-11-C-0098. The U.S. Government has certain rights to this invention.

FIELD OF THE INVENTION

The present invention relates to data privacy and encryption and more specifically to a system and method for merging encryption data using circular encryption key switching and without sharing any private keys.

BACKGROUND

A typical system for enabling multiple entities to exchanging data or communicate with one another may include a form of a distributed communication system, in which multiple parties to a communication are connected to each other through a network and a central hub or switch. In many circumstances, where that data being exchanged includes sensitive information, it is important to maintain privacy from external security threats. Additionally, in some circumstances, the network itself may not be reliably secure or trustworthy. For example, various parties engaging in a teleconference may be speaking about sensitive information from various trusted locations throughout the world, but the telecommunication system or the central data mixer used to transmit data between the parties may not be secure or trustworthy.

There has been prior work on the mixing of data of different rates, however none of those approaches are compatible with the homomorphic encryption scheme such that privacy-preserving mixing can be performed, for example, for encrypted voice over IP (VoIP).

Moreover, these prior approaches do not cover encrypted VoIP teleconferencing, where encryption keys do not need to be shared with a VoIP mixer, in a manner that scales linearly with the number of participants (clients). Many consumer VoIP solutions do not support encryption of the signaling path or the media. As a result, the lack of encryption makes it relatively easy to eavesdrop on VoIP calls when access to the data network is possible.

SUMMARY OF THE INVENTION

In some embodiments, the present invention is directed to a system and method for merging encryption data using circular encryption key switching and without sharing any private keys.

In some embodiments, the present invention is a method for data privacy in a distributed communication system, in which a plurality of client terminals are arranged in a ring configuration. The method includes: receiving by a first client terminal of the plurality of client terminals, a second public key from a second client terminal of the plurality of client terminals; generating a second key switch hint for the second client terminal, by the first client terminal, using the second public key and a first private key of the first client terminal; transmitting the second key switch hint and first encryption data from the first client terminal to a mixer; receiving by the second client terminal, a third public key from a third client terminal of the plurality of client terminals; generating a third key switch hint for the third client terminal, by the second client terminal, using the third public key and a second private key of the second client terminal; transmitting the third key switch hint and second encryption data from the second client terminal to the mixer; receiving by the third client terminal, a first public key from the first client terminal; generating a first key switch hint for the first client terminal, by the third client terminal, using the first public key and a first private key of the first client terminal; transmitting the first key switch hint and third encryption data from the third client terminal to the mixer; using, by the mixer, the second key switch hint and the first encrypted data from the first client terminal to switch the first encrypted data to generate a first switched encrypted data; adding the encrypted data representation for the second client terminal to the second encryption data from the second client terminal to output a first summed data encryption; using, by the mixer, the third key switch hint and the first summed data encryption to switch the first summed data encryption to generate a second switched encrypted data; adding the second switched encrypted data to the third encryption data from the third client terminal to output a third encryption data representation for the third client terminal; and sending the third encryption data representation to the third client terminal to be decrypted by the third client terminal.

In some embodiments, the present invention is a distributed communication system, including: a mixer to performing operation on encrypted data streams; a first client terminal for receiving a second public key from a second client terminal; generating a second key switch hint for the second client terminal, using the second public key and a first private key of the first client terminal; and transmitting the second key switch hint and first encryption data from the first client terminal to the mixer; wherein the second client terminal receives a third public key from a third client terminal; generates a third key switch hint for the third client terminal, using the third public key and a second private key of the second client terminal; and transmits the third key switch hint and second encryption data to the mixer; wherein the third client terminal receives a first public key from the first client terminal; generates a first key switch hint for the first client terminal, using the first public key and a first private key of the first client terminal; and transmits the first key switch hint and third encryption data to the mixer; wherein the mixer uses the second key switch hint and the first encrypted data from the first client terminal to switch the first encrypted data to generate a first switched encrypted data; and adds the encrypted data representation for the second client terminal to the second encryption data from the second client terminal to output a first summed data encryption; and wherein the mixer uses the third key switch hint and the first summed data encryption to switch the first summed data encryption to generate a second switched encrypted data; adds the second switched encrypted data to the third encryption data from the third client terminal to output a third encryption data representation for the third client terminal; and sends the third encryption data representation to the third client terminal to be decrypted by the third client terminal.

The mixer may also use the first key switch hint and the third encryption data representation to switch the third encryption data representation to a first encryption data representation for the first client; and send the first encryption data representation to the first client terminal to be decrypted by the first client terminal.

The mixer may also use the second key switch hint and the first encryption data representation to switch the first encryption data representation to a second encryption data representation for the second client; and send the second encryption data representation to the second client terminal to be decrypted by the second client terminal.

In some embodiments, the mixer combines the first, second and third encryption data representations in a matrix, a first column of the matrix including the first encryption data representation, a second column of the matrix including the second encryption data representation, and a third column of the matrix including the third encryption data representation

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

In some embodiments, the present invention is a system and method for merging encryption data using circular encryption key switching and without sharing any private keys in a distributed communication system, for example, Voice over IP (VoIP) teleconferencing systems, video conferencing systems, control systems, detection systems, accounting systems, and the like.

In some embodiments, the present invention provides a system and method for parties (e.g., several client terminals) to have privacy-preserving teleconferences, where communication privacy is maintained despite all communications of the clients being observed during the teleconference, even at the teleconference mixer. This approach uses an alternative key sharing capability, in which client terminals share their public keys with each other before a teleconference starts. The present invention improves upon the prior approaches, because in the scheme of the present invention, the public keys can be shared at any time prior to the start of the data communication that is convenient. This reduces the use of communication and computation resources at the start of the communication.

The invention uses key switch hints to delegate decryption capability from one client (terminal) to another. After delegating decryption capability to an intended client (terminal), the client can decrypt the encrypted data, which is delegated to it. As a result, the system and method of the present invention require less memory compared to methods, which require a VoIP mixer to store m key switch hints where m is the number of client terminals.

In some embodiments, in the case of teleconferencing, the clients encode their voice samples with an additive encoding scheme, encrypt their encoded voice data with an additive homomorphic encryption scheme, and send their encrypted voice (data) samples to a mixer. The mixer switches all encrypted data into respective data representations to respective client terminals, where each data representation can be decrypted by the intended (recipient) client. The mixer performs an encrypted homomorphic addition on the encrypted voice (data). The mixer sends the results back to the clients. The clients then decrypt, decode and play back the resulting decrypted voice (data). This scheme pre-shares public keys for an additive homomorphic encryption scheme, performs key switching and requires that the clients agree on a common additive encoding scheme.

Figure 1:
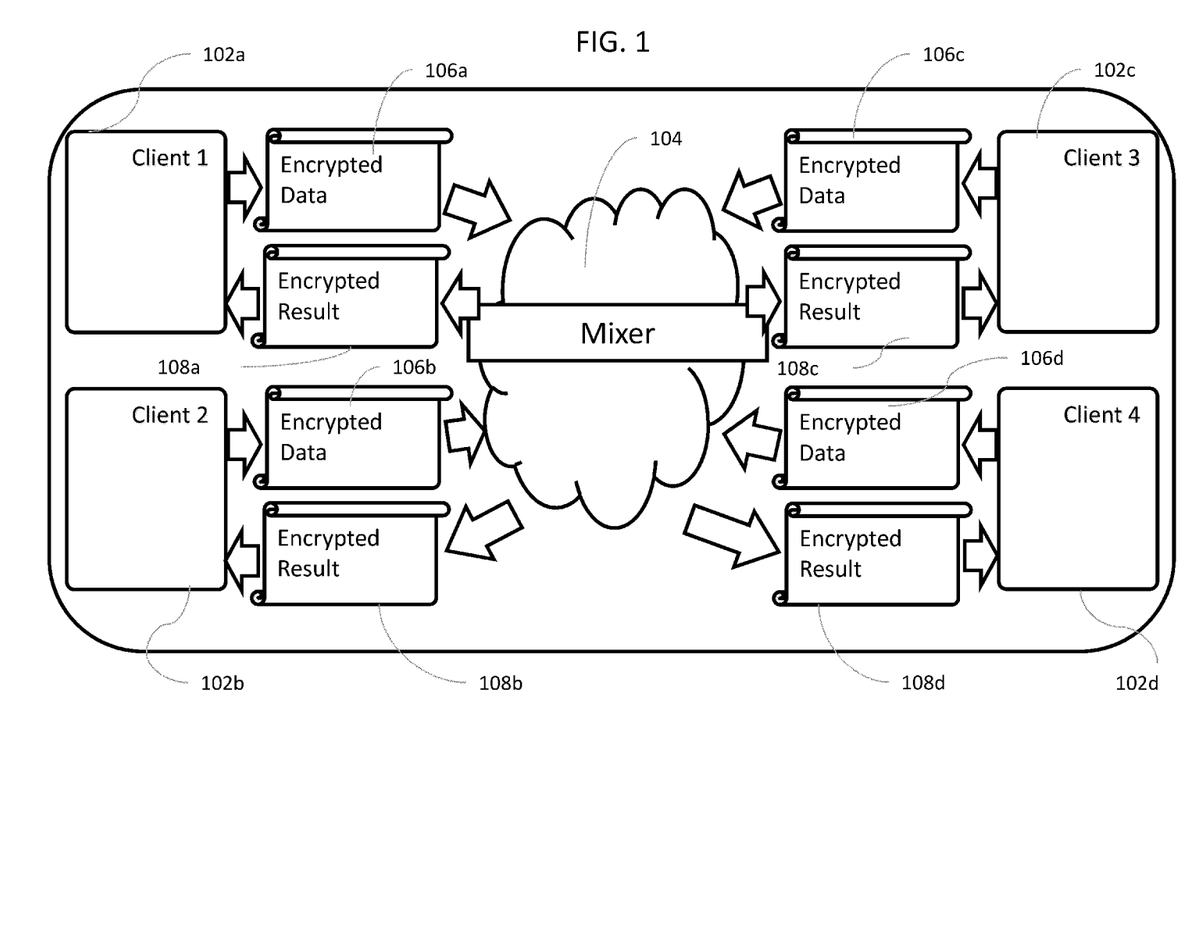
FIG. 1 shows an exemplary block diagram for a distributed communication system, according to some embodiments of the present invention.

FIG. 1 shows an exemplary block diagram for a distributed communication system, according to some embodiments of the present invention. Each of the clients 102a, 102b, 102c and 102d samples voice data (in the case of voice), encodes it, encrypts it and sends the encrypted data 106a, 106b, 106c or 106d to a mixer 104. The mixer 104 operates on the encrypted data and sends the results 108a, 108b, 108c and 108d back to the respective client terminals, which are then decrypted, decoded and played back (in the case of voice) to the respective clients.

Any encryption system may be used with the system and method of the present invention that supports an additive homomorphism and key switching which could be implemented in a practical manner. A representational scheme is NTRU which can be made to both a Somewhat Homomorphic Encryption (SHE) scheme and a Fully Homomorphic Encryption (FHE) scheme, and which supports key switching.

Figure 2:
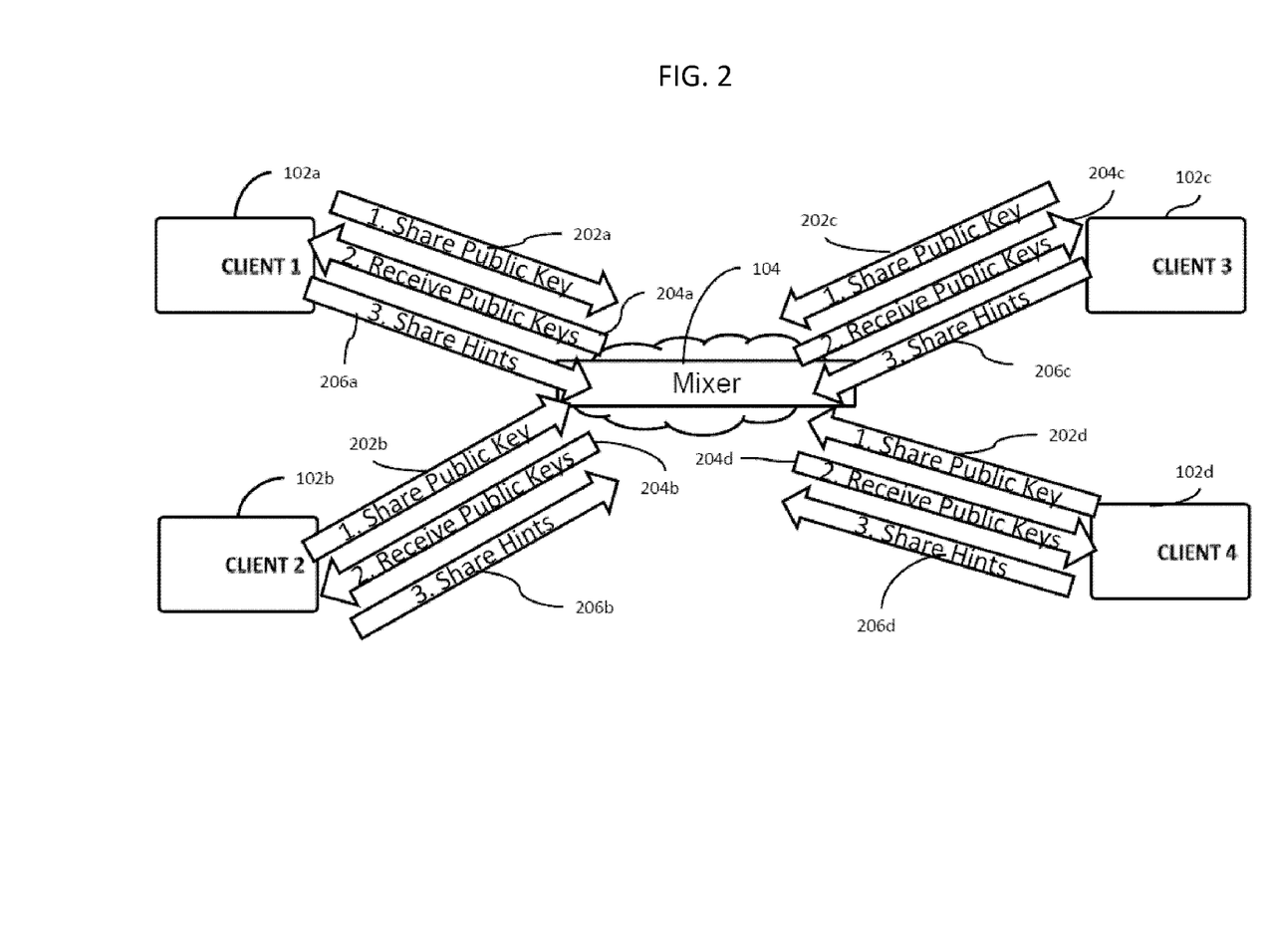
FIG. 2 shows an exemplary block diagram depicting keys and hints sharing, according to some embodiments of the present invention.

FIG. 2 shows an exemplary block diagram depicting keys and hints sharing, according to some embodiments of the present invention. The diagram illustrates a circular way (ring configuration), in which the public encryption keys are shared among the clients and hints shared with the mixer, in some embodiments of the present invention. As depicted, client terminals (clients) 102a, 102b, 102c and 102d share their public keys 202a, 202b, 202c and 202d, in a circular manner through, for example, a mixer (or other entity) 104. However, in some embodiments, a mixer need not be used to share keys, rather, other sources, including any of the client terminals may be used to share keys. This sharing only needs to be performed once and could be done in a batch manner, for example, every time a client joins, or every time a teleconference is organized. Mixer 104 sends public keys to clients and the clients receive the respected public keys (204a, 204b, 204c and 204d) to generate respective key switch hints 206a, 206b, 206c and 206d. These key switch hints are then used to switch respective encrypted data to corresponding data representations for each client. For example, as shown, client 102a sends it public key 202a to be shared and receives from one of the other clients 102b, 102c or 102d its public keys (202b, 202c or 202d), as shown by arrow 204a.

Figure 5:
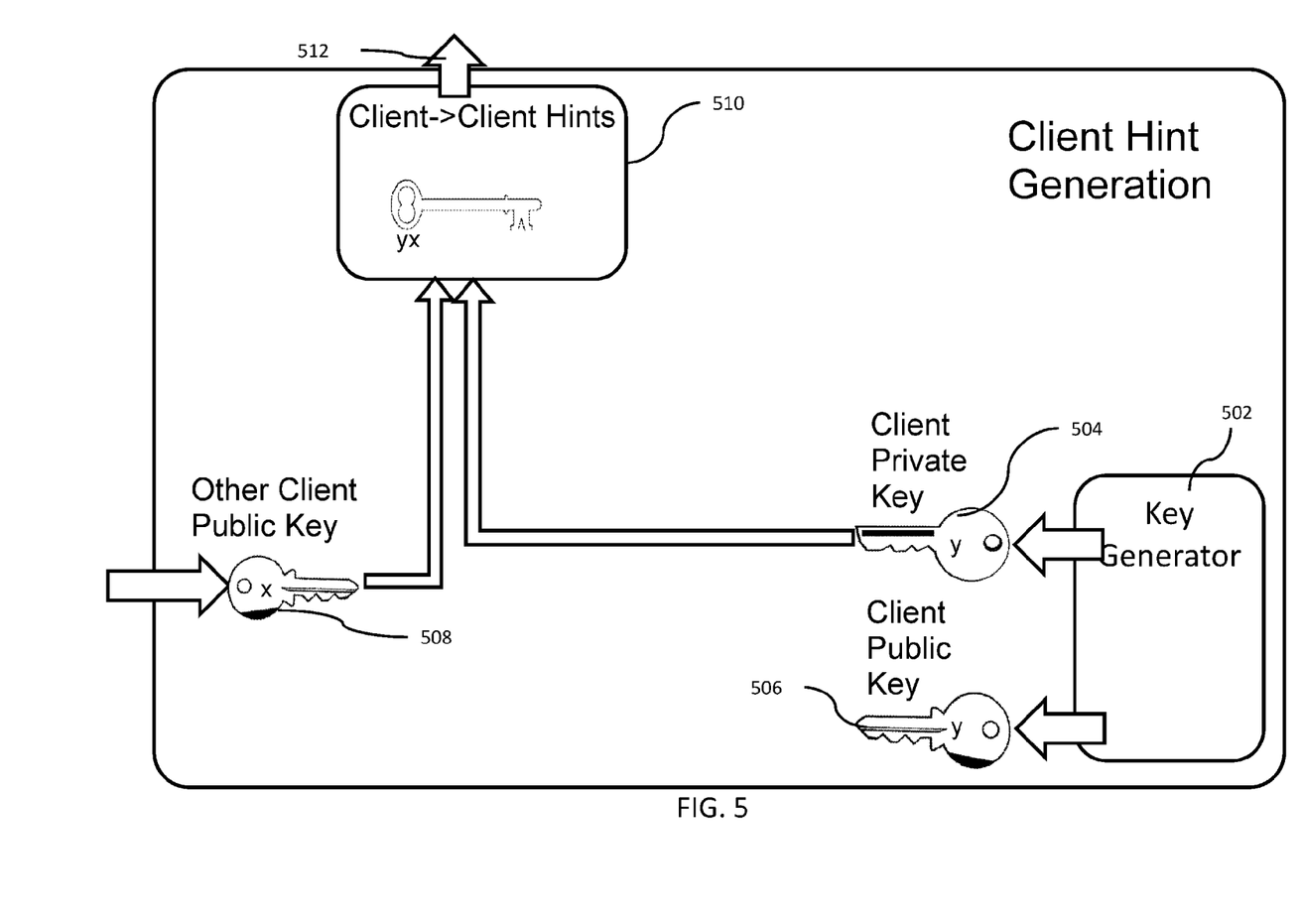
FIG. 5 shows an exemplary hint generation approach, according to some embodiments of the present invention.

FIG. 5 shows an exemplary hint generation approach, according to some embodiments of the present invention. For every client terminal, a key switch hint to be sent from that client terminal to the mixer is generated. All the key switch hints, but none of the keys, are shared with the mixer. As shown, each client terminal receives other clients' respective public keys 508 (for example, from the mixer) and uses its own private key 504 to generate a client1-to-next-client hint 512, by a key hint generation module 510. For example, client 102a and receives client's 102b public key 202b, as shown by 508 in FIG. 5. Client 102a then uses its own private key 504 to generate a client 102a-to-client 102b key switch hint 512.

The key switch hint generation procedure depends on the specific type of additive homomorphic encryption scheme used. Because private keys are not shared, no other key switch hints can be generated to take the result and delegate its decryption to another entity. An example of the key switching for NTRU case would be to convert a ciphertext of degree of at most d, encrypted under a secret key f1, into a degree-1 ciphertext c2 encrypted under a secret key f2 (which may or may not be the same as f1). The "hint" is $a12 = m*f1^d*f2^{-1} \mod q$ for a short $m \in R$ congruent to 1 modulo p. Then, $m = p*e+1$ can be chosen for a Gaussian distributed e.). The key switch operation is then defined as the function *:

KeySwitch(c1,a12): $c2 = a12*c1 \mod q$.

In some embodiments, the invention uses an arbitrary ordering of the clients. The clients are arbitrarily ordered from 1 to m. For example, at start-up, client2's public key is sent to client1 to generate a key switch hint, client3's public key is sent to client2 to generate a key switch hint, and client1's public key is sent to client m to generate a key switch hint. In some embodiments, the key switch hints are stored by the mixer.

Figure 3:
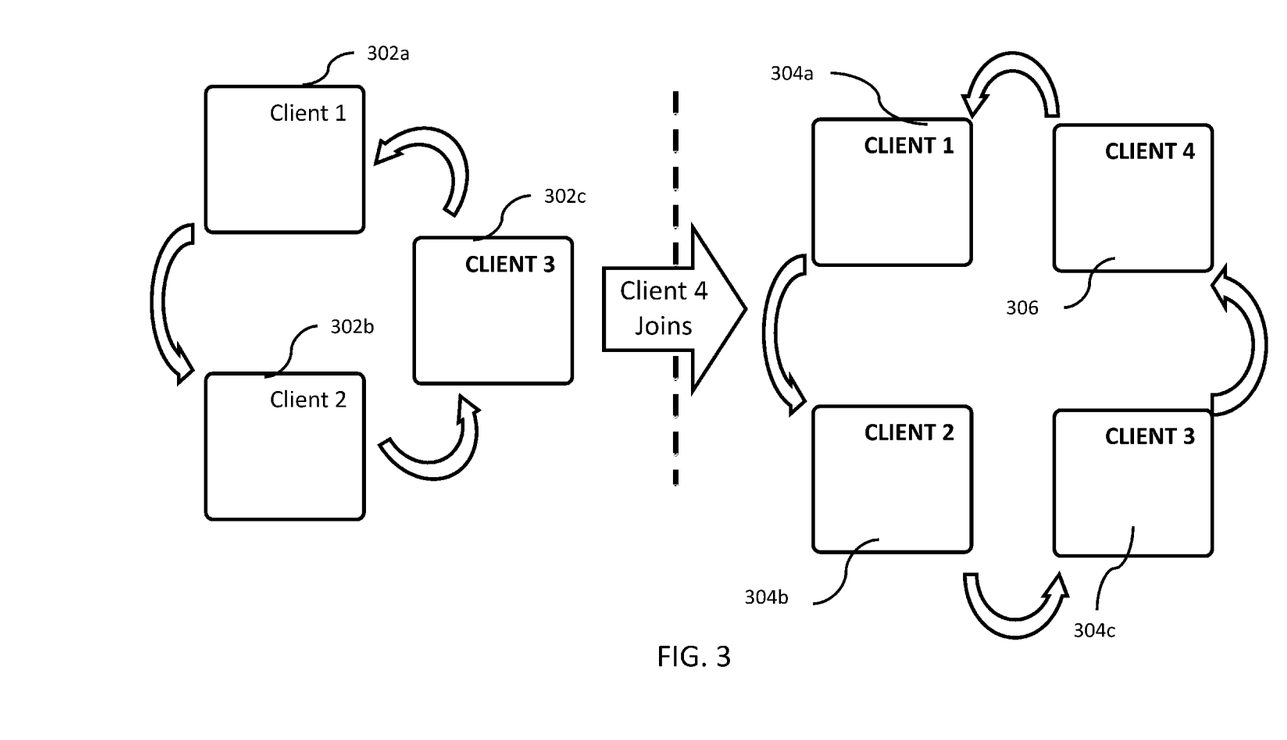
FIG. 3 is an exemplary block diagram illustrating adding a new client terminal, according to some embodiments of the present invention.

FIG. 3 is an exemplary block diagram illustrating adding a new client terminal, according to some embodiments of the present invention. Client terminals 302a, 302b and 302c are already in the ring configuration and client4 needs to be added to the ring, for example, as a new user in a conference call or distributed data communication. As shown, when a new client4 is added, it is added to the end of the list, as shown by client4 306. The new (larger) ring configuration would include client2 304b receiving client1's public key, client3 304c receiving client2's 304b public key, new client4 306 receiving client3's public key and client1 304a receiving new client4's public key.

In general, when a new client m+1 is added, client1's public key is sent to client m+1 to generate a key switch hint and client m+1's public key is sent to client m to generate a key switch hint. In some embodiments, the key switch hints may be stored by the mixer.

Figure 4:
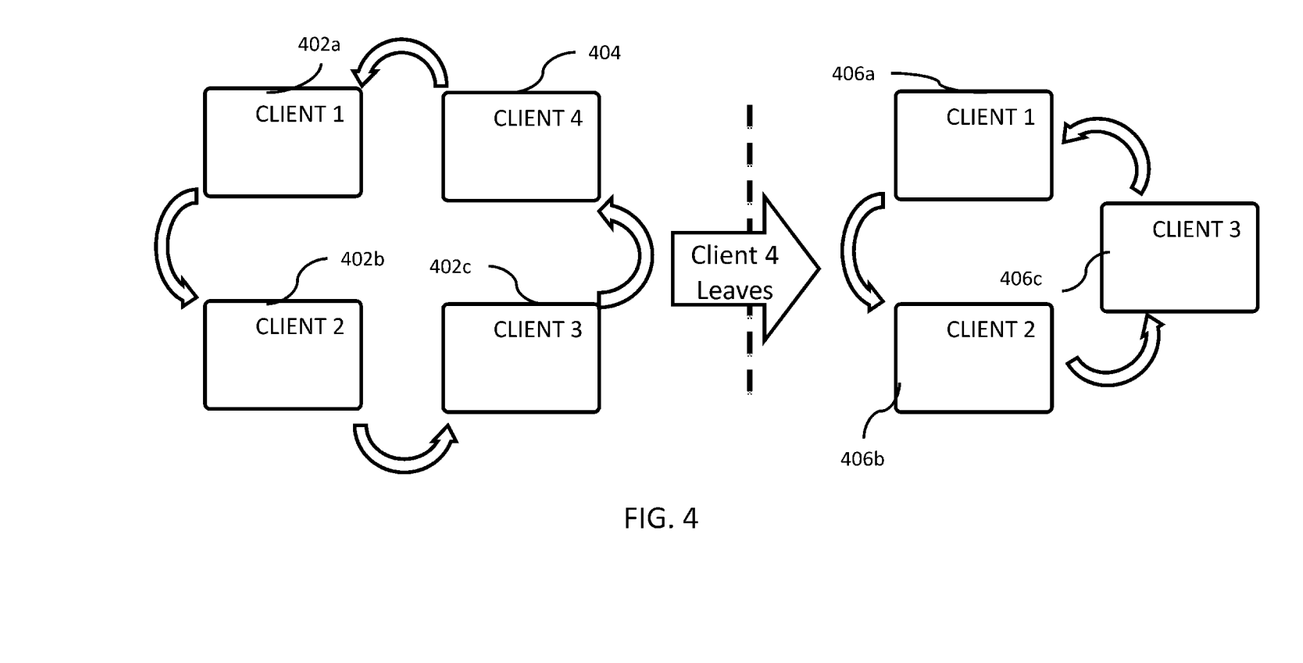
FIG. 4 is an exemplary block diagram depicting removing a new client terminal, according to some embodiments of the present invention.

FIG. 4 is an exemplary block diagram depicting removing a new client terminal, according to some embodiments of the present invention. As illustrated, when a client terminal 404 is removed, the list is reordered from 1 to m−1, for example, 406a, 406b and 406c. In general, when client i is removed, the new client i+1's public key is sent to the new client i to generate a key switch hint and the new client i's public key is sent to client i−1 to generate a key switch hint. The new (smaller) ring configuration would include client2 406b receiving client1's (406a) public key, client3 406c receiving client2's public key, and client1 receiving client3's public key.

Figure 6:
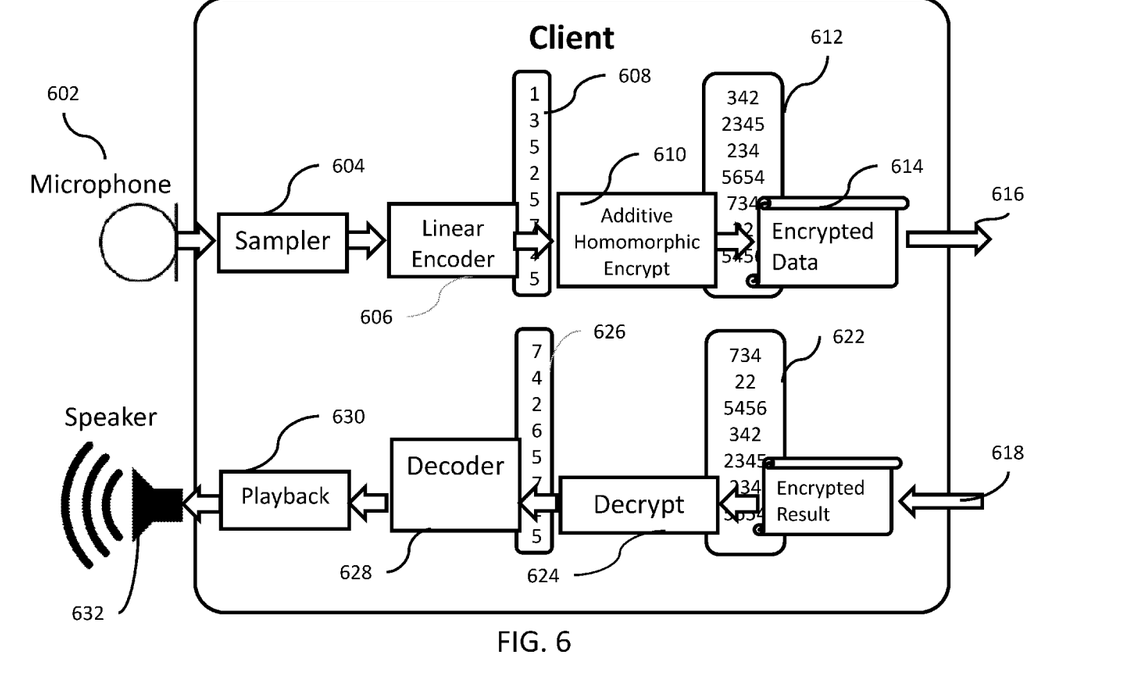
FIG. 6 shows data encryption and decryption by a client terminal, according to some embodiments of the present invention.

FIG. 6 shows data encryption and decryption by a client terminal, according to some embodiments of the present invention. The example illustrated by FIG. 6 relates to voice conferencing and includes a microphone 602, to capture the voice, a sampler 604 to sample the analog voice signals, and a playback 630 to play back the voice via a speaker 632. However, in case of general data communication without voice, microphone 602, sampler 604, playback 630 and speaker 632 may not be needed. As shown, a client terminal receives the voice data from a microphone 602, samples the voice data using the sampler 604 and feeds the sampled data to an encoder 606, which encodes the data and generates a data vector 608. The data vector 608 is then encrypted with client's private key by an additive homomorphic encryption module 610, using an additive homomorphic encryption scheme. The encrypted data is represented by vector 612, which is then sent 616 to a mixer to be operated on.

After the mixing operation is performed, the encrypted result 618 is received from the mixer, for example, in the form of a vector 622. The result 618 is decrypted by a decryption module 624 to generate a vector 626 of decrypted data to be decoded by the decoder 628. In case of voice data, the decrypted data is played back (630) over a speaker 632. In the case of non-voice data communication, the decoded data is send to a desired destination, without any play back.

In some embodiments, a NTRU algorithm is used as a representational additive homomorphic encryption scheme which provides encryption and decryption functions. The NTRU encryption algorithm is lattice based, which, is based on the shortest vector problem in a lattice. Operations are based on objects in a truncated polynomial ring with convolution multiplication, where all polynomials in the ring have integer coefficients.

Figure 7:
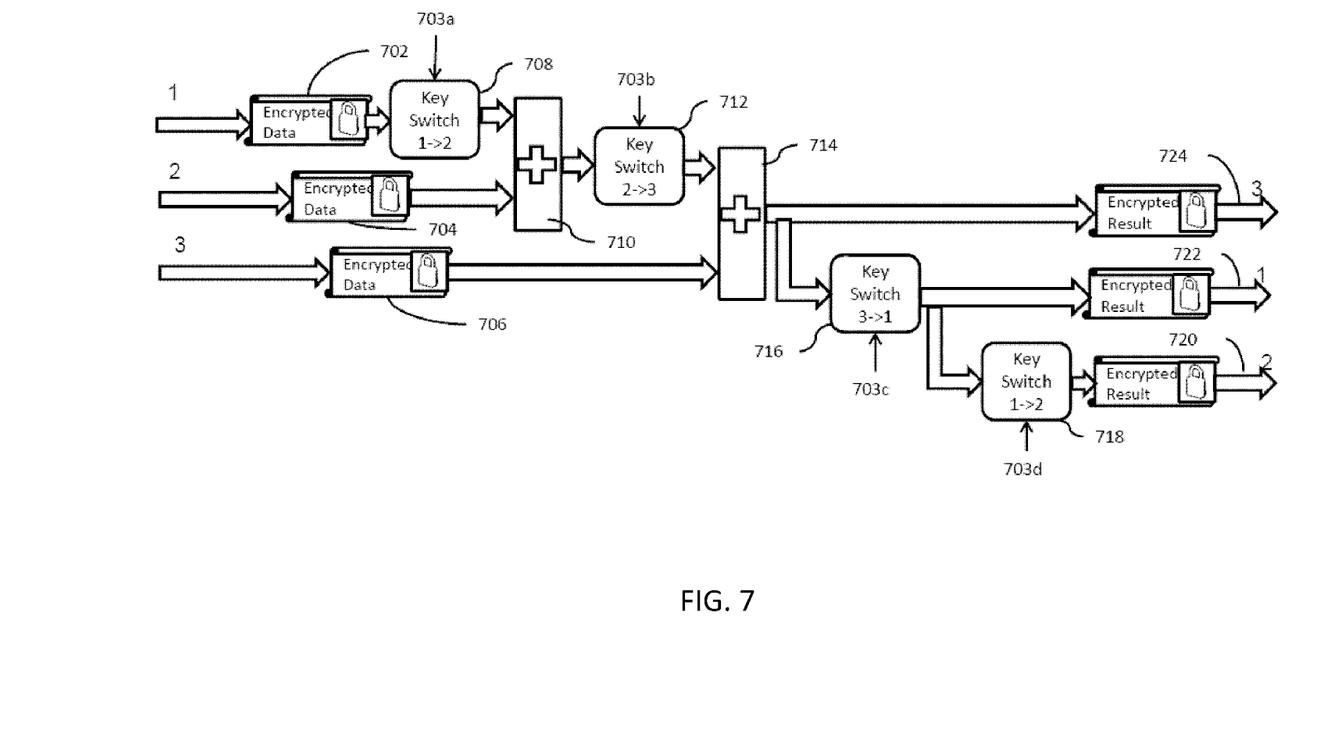
FIG. 7 depicts an exemplary block diagram of a mixer for circular mixing of encrypted data, according to some embodiments of the present invention.

FIG. 7 depicts an exemplary block diagram of a mixer for circular mixing of encrypted data, according to some embodiments of the present invention. Although a mixer is used in the example of FIG. 7, as described above, other sources, including any of the client terminals may be used to share keys, instead of the mixer. As shown encrypted data (702, 704 and 706) and hints (703a, 703b, 70-3c and 703d) are received from respective client terminals. A first key switch operation 708 is performed, for example, on the encrypted data 702 from client1, using the key switch hint 703a generated by client1 for client2. The result is added by an adder 710 to the encrypted data 704 from client1. A second key switch operation 712 is performed on the output of the adder 710, using the key switch hint 703b generated by client2 for client3. The result of the second key switch operation 712 is added by an adder 714 to the encrypted data 706 from client3.

The output of the adder 714 is an encrypted data representation (result) 724 for the client3 that is sent to client 3. A third key switch operation 716 is performed on the output of the adder 714, using the key switch hint 703c generated by client3 for client1. The output of the third key switch operation 716 is an encrypted data representation (result) 722 for the client1 that is sent to client 1. Furthermore, a fourth key switch operation 718 is performed on the output of the third key switch operation 716, using the key switch hint 703d generated by client1 for client2. The output of the fourth key switch operation 718 is an encrypted data representation (result) 720 for the client2 that is sent to client 2.

In some embodiments, the encrypted data representation (724, 722 and 720) for the clients 3, 1 and 2, are combined in a matrix, in which each column of the matrix represents one of the encrypted data representation. The appropriate matrix column is then sent to the corresponding client. In some embodiments, the entire matrix may be sent to all the clients. Each client then extracts its own encrypted data representation (result) from the matrix. In the case of voice, it may be desired not to send back the same voice generated by a specific client to that specific client. Consequently, the entire matrix, minus the column to the specific client is sent to that specific client.

In some embodiments, for a representational NTRU-based additive homomorphic encryption scheme, the mixer would need to know the ring dimension and ciphertext modulus.

This information may be embedded in the key switch hints. In some embodiments, each of the clients uses an authentication scheme to guarantee they are receiving public keys from intended recipients of their data. Conventional authentication schemes are used to authenticate a first client to a second client.

Figure 8:
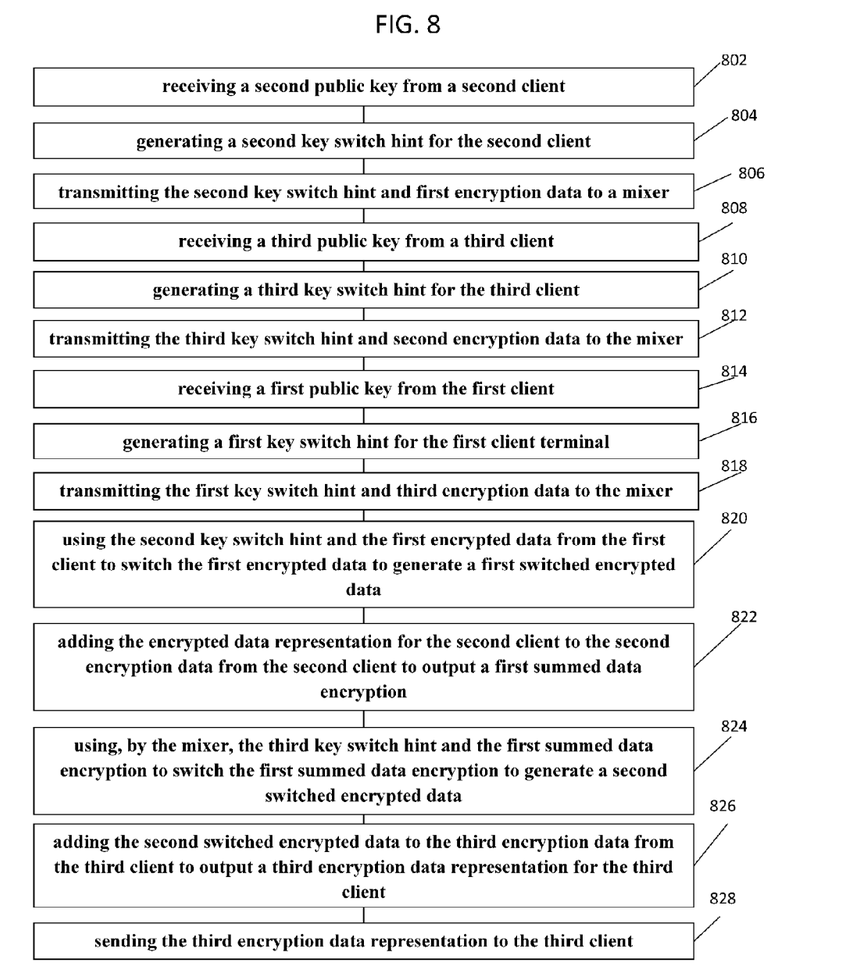
FIG. 8 is an exemplary process flow, according to some embodiments of the present invention.

FIG. 8 is an exemplary process flow, according to some embodiments of the present invention. In block 802, a second public key is received from a second client terminal of the plurality of client terminals. A second key switch hint is generated for the second client terminal, by the first client terminal, using the second public key and a first private key of the first client terminal, in block 804. The second key switch hint and first encryption data from the first client terminal is then transmitted to a mixer or equivalent thereof, in block 806. In block 808, a third public key is received from a third client terminal and a third key switch hint for the third client terminal is generated by the second client terminal, using the third public key and a second private key of the second client terminal, in block 810. The third key switch hint and second encryption data are then transmitted from the second client terminal to the mixer, in block 812.

In block 814, a first public key is received from the first client terminal, and a first key switch hint is generated for the first client terminal by the third client terminal, using the first public key and a first private key of the first client terminal, in block 816. The first key switch hint and third encryption data from the third client terminal data are then transmitted to the mixer, in block 818.

In block 820, the mixer uses the second key switch hint and the first encrypted data from the first client terminal to switch the first encrypted data to generate a first switched encrypted data. The mixer then adds the encrypted data representation for the second client terminal to the second encryption data from the second client terminal to output a first summed data encryption, in block 822. The mixer then uses the third key switch hint and the first summed data encryption to switch the first summed data encryption to generate a second switched encrypted data, in block 824. The mixer then adds the second switched encrypted data to the third encryption data from the third client terminal to output a third encryption data representation for the third client terminal, in block 826. In block 828, the mixer sends the third encryption data representation to the third client terminal to be decrypted by the third client terminal.

Additionally, the mixer may use the first key switch hint and the third encryption data representation to also switch the third encryption data representation to a first encryption data representation for the first client and send the first encryption data representation to the first client terminal to be decrypted by the first client terminal.

Moreover, the mixer may use the second key switch hint and the first encryption data representation to switch the first encryption data representation to a second encryption data representation for the second client, and send the second encryption data representation to the second client terminal to be decrypted by the second client terminal. This way, no private key is shared by any client terminal with any other entity, which results in a much better security and privacy of the data.

In some embodiments, for example, in the case of voice communication, for the situation where a client would not want to receive its own voice data in the summation, the summation operations would be over a matrix addition where the added data in each column is the result for each client. This added column may be set to 0, if the corresponding recipient of the column is not intended to receive the voice data being added and all other columns would be the data being added. Redundant column data need not be carried through the process. For example, if cij represents the ciphertext from client i in the key j representation, the first summation would be [c22,c12,c12+c22]. The result of the 2nd summation would be [c23+c33,c13+c33,c13+c23,c13+c23+c33]. The result of a 3rd summation would be [c24+c34,c44, c14+c34+c44,c14+c24+c34,c14+c24+c34+c44].

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for data privacy in a distributed communication system, in which a plurality of client terminals are arranged in a ring configuration, the method comprising:

receiving by a first client terminal of the plurality of client terminals, a second public key from a second client terminal of the plurality of client terminals;

generating a second key switch hint for the second client terminal, by the first client terminal, using the second public key and a first private key of the first client terminal;

transmitting the second key switch hint and first encryption data from the first client terminal to a mixer;

receiving by the second client terminal, a third public key from a third client terminal of the plurality of client terminals;

generating a third key switch hint for the third client terminal, by the second client terminal, using the third public key and a second private key of the second client terminal;

transmitting the third key switch hint and second encryption data from the second client terminal to the mixer;

receiving by the third client terminal, a first public key from the first client terminal;

generating a first key switch hint for the first client terminal, by the third client terminal, using the first public key and a first private key of the first client terminal;

transmitting the first key switch hint and third encryption data from the third client terminal to the mixer;

using, by the mixer, the second key switch hint and the first encrypted data from the first client terminal to switch the first encrypted data to generate a first switched encrypted data;

adding the encrypted data representation for the second client terminal to the second encryption data from the second client terminal to output a first summed data encryption;

using, by the mixer, the third key switch hint and the first summed data encryption to switch the first summed data encryption to generate a second switched encrypted data;

adding the second switched encrypted data to the third encryption data from the third client terminal to output a third encryption data representation for the third client terminal; and sending the third encryption data representation to the third client terminal to be decrypted by the third client terminal.

2. The method of claim 1, further comprising: using, by the mixer, the first key switch hint and the third encryption data representation to switch the third encryption data representation to a first encryption data representation for the first client; and sending the first encryption data representation to the first client terminal to be decrypted by the first client terminal.

3. The method of claim 2, further comprising: using, by the mixer, the second key switch hint and the first encryption data representation to switch the first encryption data representation to a second encryption data representation for the second client; and sending the second encryption data representation to the second client terminal to be decrypted by the second client terminal.

4. The method of claim 3, further comprising: combining the first, second and third encryption data representations in a matrix, a first column of the matrix including the first encryption data representation, a second column of the matrix including the second encryption data representation, and a third column of the matrix including the third encryption data representation.

5. The method of claim 4, further comprising sending one or more columns of the matrix to a respective client terminal.

6. The method of claim 4, further comprising sending the matrix to all of the client terminals.

7. The method of claim 4, further comprising replacing the content of a respective column of the matrix corresponding to a respective client terminal with all zeroes, before sending the matrix to the respective client terminal.

8. The method of claim 1, wherein the data communication between the plurality of client terminals is one or more voice data communication and video data communication.

9. The method of claim 1, wherein the first encryption data, the second encryption data and the third encryption data are encoded before being encrypted by the respective client terminal.

10. The method of claim 1, wherein each of the first, second and third encryption data representations is decrypted and decoded by a respective client terminal.

11. The method of claim 1, further comprising: adding a new fourth client terminal to the ring configuration of the plurality of the client terminals and arranging the ring configuration so that the second client terminal receives the first public key, the third client terminal receives the second public key, the new fourth client terminal receives the third public key and the first client terminal receives a fourth public key of the new fourth client terminal.

12. The method of claim 8, further comprising: removing the fourth client terminal from the ring configuration of the plurality of the client terminals and arranging the ring configuration so that second client terminal receives the first public key, the third client terminal receives the second public key, and the first client terminal receives the third public key.

13. The method of claim 1, further comprising: authenticating a sending client terminal by a receiving client terminal.

14. A distributed communication system, in which a plurality of client terminals are arranged in a ring configuration, comprising:
a mixer to performing operation on encrypted data streams;
a first client terminal for receiving a second public key from a second client terminal; generating a second key switch hint for the second client terminal, using the second public key and a first private key of the first client terminal; and transmitting the second key switch hint and first encryption data from the first client terminal to the mixer,
wherein the second client terminal receives a third public key from a third client terminal; generates a third key switch hint for the third client terminal, using the third public key and a second private key of the second client terminal; and transmits the third key switch hint and second encryption data to the mixer,
wherein the third client terminal receives a first public key from the first client terminal; generates a first key switch hint for the first client terminal, using the first public key and a first private key of the first client terminal; and transmits the first key switch hint and third encryption data to the mixer,
wherein the mixer uses the second key switch hint and the first encrypted data from the first client terminal to switch the first encrypted data to generate a first switched encrypted data; and adds the encrypted data representation for the second client terminal to the second encryption data from the second client terminal to output a first summed data encryption, and
wherein the mixer uses the third key switch hint and the first summed data encryption to switch the first summed data encryption to generate a second switched encrypted data; adds the second switched encrypted data to the third encryption data from the third client terminal to output a third encryption data representation for the third client terminal; and sends the third encryption data representation to the third client terminal to be decrypted by the third client terminal.

15. The distributed communication system of claim 14, wherein the mixer is further configured to use the first key switch hint and the third encryption data representation to switch the third encryption data representation to a first encryption data representation for the first client; and send the first encryption data representation to the first client terminal to be decrypted by the first client terminal.

16. The distributed communication system of claim 15, wherein the mixer is further configured to use the second key switch hint and the first encryption data representation to switch the first encryption data representation to a second encryption data representation for the second client; and send the second encryption data representation to the second client terminal to be decrypted by the second client terminal.

17. The distributed communication system of claim 16, wherein the mixer is further configured to combine the first, second and third encryption data representations in a matrix, a first column of the matrix including the first encryption data representation, a second column of the matrix including the second encryption data representation, and a third column of the matrix including the third encryption data representation.

18. The distributed communication system of claim 17, wherein the mixer is further configured to send a respective column of the matrix to a respective client terminal.

19. The distributed communication system of claim 17, wherein the mixer is further configured to send the matrix to all of the client terminals.

20. The distributed communication system of claim 17, wherein the mixer is further configured to replace the content of a respective column of the matrix corresponding to a respective client terminal with all zeroes, before sending the matrix to the respective client terminal.

* * * * *